(12) United States Patent
Klüting et al.

(10) Patent No.: US 11,181,051 B2
(45) Date of Patent: Nov. 23, 2021

(54) MIXTURE FORMATION DEVICE FOR A GAS ENGINE AND GAS ENGINE

(71) Applicant: Volkswagen Aktiengesellschaft, Wolfsburg (DE)

(72) Inventors: Christian-B. Klüting, Wolfsburg (DE); Frank Beger, Wolfsburg (DE); Martin Kiel, Mannhausen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 237 days.

(21) Appl. No.: 16/467,608

(22) PCT Filed: Nov. 28, 2017

(86) PCT No.: PCT/EP2017/080634
§ 371 (c)(1),
(2) Date: Jun. 7, 2019

(87) PCT Pub. No.: WO2018/104107
PCT Pub. Date: Jun. 14, 2018

(65) Prior Publication Data
US 2020/0032722 A1  Jan. 30, 2020

(30) Foreign Application Priority Data
Dec. 8, 2016 (DE) ...................... 10 2016 123 826.0

(51) Int. Cl.
*F02D 19/02* (2006.01)
*F02M 21/02* (2006.01)
(Continued)

(52) U.S. Cl.
CPC ....... *F02D 19/023* (2013.01); *F02M 21/0278* (2013.01); *B01F 2215/0086* (2013.01);
(Continued)

(58) Field of Classification Search
CPC .. F02D 19/023; F02M 21/0278; F02M 26/19; F02M 21/0281; F02M 21/047;
(Continued)

(56) References Cited

U.S. PATENT DOCUMENTS

| | | | |
|---|---|---|---|
| 2,311,315 A * | 2/1943 | Smith | F02M 21/047 48/180.1 |
| 4,275,017 A | 6/1981 | Rollins | |

(Continued)

FOREIGN PATENT DOCUMENTS

| | | |
|---|---|---|
| CN | 104641098 A | 5/2015 |
| DE | 35 04 796 A1 | 8/1986 |

(Continued)

OTHER PUBLICATIONS

Office Action for Chinese Patent Application No. 201780075943.2, dated Nov. 4, 2020.

(Continued)

*Primary Examiner* — Hung Q Nguyen
(74) *Attorney, Agent, or Firm* — Pearl Cohen Zedek Latzer Baratz LLP (57) ABSTRACT

A mixture formation device for an internal combustion engine operated with a burnable gas, preferably compressed natural gas CNG, comprises a combination of a quantity regulator, a gas mixer, a flow-guiding element for pressure recovery, and a connection possibility for exhaust gas recirculation of the internal combustion engine. The mixture formation device according to the invention can empty a gas tank to a comparatively low pressure of approx. 2 bar, an excellent mixture formation being achieved over the entire range of speed and load range of the internal combustion engine. According to the invention, such a mixture formation device can reduce production costs as well as space requirements compared to known solutions. An internal (Continued)

combustion engine operated with a burnable gas, particularly compressed natural gas (CNG), may also comprise such a mixture formation device in the intake tract thereof.

13 Claims, 7 Drawing Sheets

(51) Int. Cl.
  *F02M 26/19* (2016.01)
  *F02M 21/04* (2006.01)
  *F02M 35/10* (2006.01)

(52) U.S. Cl.
  CPC ....... *F02M 21/0281* (2013.01); *F02M 21/047* (2013.01); *F02M 26/19* (2016.02); *F02M 35/10222* (2013.01)

(58) Field of Classification Search
  CPC ................ F02M 21/042; F02M 26/51; F02M 35/10222; F02M 35/10242; F02M 35/10262; F02M 35/10216; F02M 61/145; B01F 2215/0086; Y02T 10/30
  See application file for complete search history.

(56) References Cited

U.S. PATENT DOCUMENTS

| | | | |
|---|---|---|---|
| 4,513,727 A | | 4/1985 | Lagano et al. |
| 4,635,609 A | | 1/1987 | Serpen et al. |
| 5,103,795 A | * | 4/1992 | Davis ................... F02M 21/045 123/527 |
| 5,245,977 A | * | 9/1993 | Chen ..................... B01F 5/0415 123/590 |
| 5,408,978 A | * | 4/1995 | Davis ................. F02M 21/0239 123/527 |
| 5,887,574 A | | 3/1999 | Smith |
| 6,026,787 A | * | 2/2000 | Sun ........................ F02M 13/08 123/525 |
| 7,036,529 B2 | * | 5/2006 | Berggren ................. F02D 9/12 123/568.17 |
| 8,453,626 B2 | * | 6/2013 | Holm ............... F02M 35/10118 123/568.18 |
| 2004/0089276 A1 | * | 5/2004 | Memmott ............ F02M 21/047 123/527 |
| 2007/0074452 A1 | * | 4/2007 | Yates ................... F02M 21/047 48/144 |
| 2011/0226218 A1 | | 9/2011 | Vongsateanchai et al. |
| 2013/0047959 A1 | * | 2/2013 | Holm ............... F02M 35/10118 123/445 |
| 2015/0025775 A1 | * | 1/2015 | Green ..................... F02D 43/04 701/103 |
| 2015/0308386 A1 | | 10/2015 | Boewing et al. |
| 2016/0222921 A1 | * | 8/2016 | Helsel .................. F02M 21/029 |
| 2016/0222936 A1 | * | 8/2016 | Helsel ..................... F02B 43/00 |

FOREIGN PATENT DOCUMENTS

| | | | | |
|---|---|---|---|---|
| DE | 38 13 249 A1 | | 11/1989 | |
| DE | 196 12 401 A1 | | 8/1997 | |
| EP | 0242579 A2 | * | 10/1987 | .......... B01F 15/0429 |
| EP | 0508164 A1 | * | 10/1992 | .......... B01F 15/0429 |
| EP | 0 859 176 A2 | | 8/1998 | |
| EP | 1 104 848 A1 | | 6/2001 | |
| EP | 1104848 A1 | * | 6/2001 | .......... F02M 21/042 |
| EP | 2 562 397 A1 | | 2/2013 | |
| FR | 539393 A | | 6/1922 | |
| GB | 2 117 045 A | | 10/1983 | |
| RU | 2375602 C2 | | 12/2008 | |
| SU | 1222879 A1 | | 4/1986 | |
| WO | WO 84/00400 A1 | | 2/1984 | |
| WO | WO 2014/040607 A1 | | 3/2014 | |
| WO | WO 2016/120050 A1 | | 8/2016 | |

OTHER PUBLICATIONS

Search report for German Patent Application No. 10 2016 123 826.0, dated Aug. 23, 2017.
International Search Report of PCT Application No. PCT/EP2017/080634, dated Feb. 8, 2018.
Search report for Russian Patent Application No. 2019117551/06(033566), dated Jan. 22, 2020.
Office Action for Chinese Patent Application No. 201780075943.2, dated Jun. 8, 2021.

* cited by examiner

MIXTURE FORMATION DEVICE FOR A GAS ENGINE AND GAS ENGINE

CROSS-REFERENCE TO RELATED APPLICATIONS

This application is a National Phase Application of PCT International Application No. PCT/EP2017/080634, International Filing Date Nov. 28, 2017, claiming priority of German Patent Application No. 10 2016 123 826.0, filed Dec. 8, 2016, which is hereby incorporated by reference.

FIELD OF THE INVENTION

The invention relates to a mixture formation device for an internal combustion engine operated with a combustible gas as well as to an internal combustion engine in whose intake tract such a mixture formation device is arranged.

BACKGROUND OF THE INVENTION

The state of the art discloses internal combustion engines which are operated with a combustible gas, for example, liquefied natural gas (LPG) or compressed natural gas (CNG). Particularly in the case of compressed natural gas (CNG), it is a challenge to feed the gas into the combustion chambers of the internal combustion engine. Since gases are far more compressible than (virtually incompressible) liquids, such a gas cannot be injected into the combustion chamber of the internal combustion engine by means of a conventional fuel pump. A compressor for a gaseous fuel is considerably larger and higher than a corresponding high-pressure fuel pump while delivering the same drive output. Even though the combustible gas can be blown directly into the combustion chamber of the internal combustion engine (analogously to the direct injection of liquid fuel), this requires a relatively high pressure level of at least 20 bar in the gas tank, as a result of which the gas tank cannot be completely emptied and consequently the driving range of the motor vehicle is markedly reduced.

German patent application DE 35 04 796 A1 discloses an air intake manifold for an internal combustion engine with a fuel carburetor, whereby the internal combustion engine can be powered either by a liquid fuel or by a gaseous fuel, as desired. In order to meet the changing requirements of the two fuel types in terms of the inflow of the combustion air and in order to lower additional consumption during operation with the gaseous fuel, a disk having a central, closeable opening is provided at a distance from the carburetor. At the higher rotational speed range of the internal combustion engine, this opening is opened so that the appropriate amount of fresh air can be drawn in for all of the characteristic map ranges.

European patent application EP 0 859 176 A2 discloses an exhaust gas return valve for an internal combustion engine having an insert, whereby, depending on the shape of the insert, the flow rates can be varied when the exhaust gas return valve is partially opened.

Moreover, the state of the art discloses simple gas mixers and so-called cross mixers that serve to mix the gaseous fuel of an internal combustion engine with the fresh air.

A drawback of such mixers having a fixed geometry, however, is that, although they deliver good results at a stationary operating point such as, for instance, in the case of an internal combustion engine of a cogeneration power station, they are rather unsuitable or call for considerable additional control and regulation resources when it comes to a dynamic operation of the type needed in a motor vehicle.

SUMMARY OF THE INVENTION

The invention is thus based on the objective of allowing a simple and cost-effective mixture formation of a gaseous fuel for an internal combustion engine, whereby the strict limit values set by the emissions legislation are met and a dynamic engine operation is possible without entailing function losses or emission disadvantages.

According to the invention, this objective is achieved by a mixture formation device for installation in an intake channel of an internal combustion engine operated with a combustible gas, comprising a closing member with which the opening cross section of the intake channel of the internal combustion engine can be reduced, also comprising at least one metering valve for metering the combustible gas into the intake channel of the internal combustion engine, as well as at least one connector for an exhaust gas recirculation line of the internal combustion engine, whereby the deflecting geometry of the closing member diverts a fresh air stream into a first ring channel, especially into a diffuser, and whereby a first feed point for the combustible gas and a second feed point for the gas that has been recirculated via the exhaust gas recirculation line are arranged downstream from the place with the deflecting geometry. This makes it possible to create a component which, in a compact installation space and in a cost-effective manner, has the functions of a quantity regulator for the fresh air stream and of a gas mixer and also fulfills the functions of flow guidance and flow optimization. Moreover, relatively good mixture processing at a low flow resistance can be achieved.

Owing to a Venturi effect during the flow through the mixture formation device, a smaller mass of fuel gas has to be introduced into the mixture formation device since the pressure in the area of the intake pressure in the flow section situated upstream from the mixture formation device is reduced, as a result of which the dynamics in the area of the fuel gas feed are improved. Moreover, the higher dynamics and the reduced pressure allow greater gas recirculation rates, without the recirculated exhaust gas accumulating in the exhaust gas recirculation line. In this context, less discharge work is needed so that the fuel gas consumption can be reduced by such a mixture formation device.

The features contained in the dependent claims constitute advantageous improvements and refinements of the mixture formation device put forward in the independent claim.

In a preferred embodiment of the invention, it is provided that the at least one metering valve meters the combustible gas into a fuel gas distribution ring that is connected via a channel to the diffuser of the intake channel. The fuel gas distribution ring can effectuate a first mixing of the combustible gas with the fresh air, which brings about a particularly uniform mixing of the combustible gas with the fresh air in the fuel gas distribution ring in the ring channel. Moreover, the fuel gas distribution ring serves to reduce pressure peaks and to homogenize the flow, thus promoting a homogeneous mixture formation. Consequently, the combustible gas can be burned in a particularly clean and low-emission manner.

In this context, it is especially preferred if the channel runs essentially perpendicular to an outflow opening of the metering valve. This brings about a sharp deflection of the combustible gas when it strikes the wall of the precombustion chamber, as a result of which a vortex is formed in the precombustion chamber, thus promoting the mixing of the combustible gas with the fresh air.

In another preferred embodiment of the invention, it is provided for the exhaust gas recirculation line to have an exhaust gas recirculation distribution ring that runs around an intake pipe of the intake channel, at least in certain sections. Due to the fact that the exhaust gas recirculation line is connected to a second ring channel, the recirculated exhaust gas can be very uniformly mixed with the mixture consisting of fresh air and combustible gas since the exhaust gas can be introduced into the first ring channel along the second ring channel via several second feed points. Consequently, the emission-lowering effect of recirculating the exhaust gas can be optimally implemented.

According to another improvement of the invention, it is provided for the closing member to have a deflecting section to guide the flow of the fresh air, of the combustible gas and/or of the recirculated exhaust gas as well as a guide section with which the closing member is positioned in a housing of the mixture formation device. Guiding the flow via the closing member can eliminate the need for additional deflecting geometries for the fresh air, since this would involve additional components or a more complex design of the housing and would entail extra costs. Moreover, working the outer contour of the closing member is usually cheaper than working the inner contour of the housing, so that here, a flow-optimized profile can be produced at relatively low manufacturing costs. Since there is an additional guide section on the closing member, the closing member can easily be positioned in the housing, without the need to interfere with the flow in the area of the deflecting geometry, the intake pipe or the first ring channel.

In this context, it is preferred for the guide section to be positioned on a closed section of the housing. This allows a negative pressure to be generated in the closed housing section in the manner of a gas spring when the valve is closed, thus generating a restoring force against the closing force of the valve. For purposes of reducing the opening and closing forces, pressure-equalization holes are made on the closing member in order to compensate for the excess pressures or negative pressures that occur when the closing member is moved.

Here, it is particularly preferred for a gasket to be arranged between the guide section and the housing. A gasket situated between the guide section and the closed housing section can prevent gas from flowing into the equalization volume, so that a gas exchange between the air guide of the mixture formation device and the equalization volume is at least largely prevented.

According to an especially advantageous refinement, it is provided for the closing member to be hollow in the area of the guide section and to surround an equalization volume. Since the closing member is hollow, a relatively large equalization volume can be delimited so that the gas forces that occur when the closing member is moved are comparatively small and can thus be controlled very well. Moreover, a hollow closing member can cut down on material and lower the weight of the closing member, as a result of which the dynamic behavior of the closing member can be enhanced.

In another preferred embodiment of the invention, it is provided for the second feed point for the exhaust gas recirculation line to be located downstream from the first feed point for the gas, as seen in the flow direction of the fresh air through the intake channel. In this manner, the surface of the wall of the first ring channel can be optimally utilized and a plurality of first and second feed points can be formed, whereby the first feed points are preferably situated on a first, shared perforated circle while the second feed points are preferably located on a second, shared perforated circle.

In another preferred embodiment of the invention, it is provided that the gap width of the diffuser amounts to approximately $\frac{1}{8}$ to $\frac{1}{800}$ of the diameter of an intake pipe of the intake channel. The flow has to pass through the first ring channel during idling as well as during full load operation. In this process, it is necessary to ensure, on the one hand, the capability to form minute quantities and, on the other hand, a maximum power yield during full load operation. In this context, depending on the application case in question, a width of $\frac{1}{8}$ to $\frac{1}{800}$ of the intake pipe, especially a width or height between 50 μm and 5 mm, has proven to be a good compromise between the low flow losses during full load operation and the throttling needed to permit a capability to form minute quantities.

According to an advantageous refinement of the invention, it is provided for the first ring channel to be configured as a diffuser. The diffuser can enlarge the outlet cross section of the first ring channel, while the flow rate (and thus the flow losses) can be reduced. As a result, a higher power can be achieved, especially during full load operation.

In this context, it is particularly preferred for the closing member to be a valve having a shaft and a disk, whereby the valve disk has a first, radially inner section that runs at a first angle relative to the valve shaft, and a second, radially outer section that runs at an angle relative to the valve shaft that is greater than that of the first section. In this manner, a diffuser can easily be formed between the valve and a straight wall of the housing.

As an alternative or in addition, it is advantageously provided for the diffuser to be formed downstream from the closing member. In this manner, a valve having a relatively short disk can be used, so that the costs and the installation space requirements for the valve can be reduced.

According to an advantageous refinement of the mixture formation device, it is provided for a recess to be formed on the valve disk or on a wall of the diffuser located opposite from the valve disk, and for a projection that protrudes into the recess to be formed on the appertaining opposite component. In order to improve the capability of the mixture formation device to form minute quantities, it is advantageous for the valve—in its closed state—to exhibit an opening cross section that is as small as possible but not equal to zero and that is situated between the valve and the wall of the housing. This can be achieved either by means of very tight manufacturing tolerances, although this is associated with high costs, or else by means of an additional flow obstruction that limits the flow. A recess and a corresponding projection can easily and inexpensively create a labyrinth seal that improves the capability of the mixture formation device to form minute quantities. In this context, it is particularly advantageous for the contour of the projection to have a profile. The profiling of the projections can improve the transition from a minute quantity of a metered-in combustible gas to an area with larger gas quantities, as a result of which the gas feed is improved and the comfort during the dynamic operation of the internal combustion engine is enhanced.

In another advantageous embodiment of the invention, it is provided for the first feed point and the second feed point to be arranged along a shared diameter. Here, preferably several first and second feed points are alternately arranged along this diameter so as to allow a uniform mixing of the fuel gas with the retuned exhaust gas.

In another improvement of the invention, it is provided for the sum of the cross sections of the first feed points for the combustible gas to be smaller than 15%, preferably smaller than 10%, of the cross-sectional surface area of the diffuser in the area of the first feed points.

The feed points for the recirculated exhaust gas and for the combustible gas are preferably configured as ring channels.

According to the invention, an internal combustion engine is also being put forward comprising at least a combustion chamber, an intake channel, an exhaust gas channel, an exhaust gas recirculation line leading from the exhaust gas channel into the intake channel as well as a mixture formation device according to the invention, whereby a combustible gas for operating the internal combustion engine is metered into the mixture formation device into the intake channel of the internal combustion engine by means of at least one regulatable metering valve upstream from the combustion chambers.

Unless otherwise indicated in individual cases, the various embodiments of the invention cited in this application can be advantageously combined with each other.

BRIEF DESCRIPTION OF THE DRAWINGS

The invention will be explained in greater detail below in embodiments on the basis of the accompanying drawings. Identical components or components having the same function are designated here with the same reference numerals. The following is shown.

DETAILED DESCRIPTION OF THE INVENTION

Figure 1:
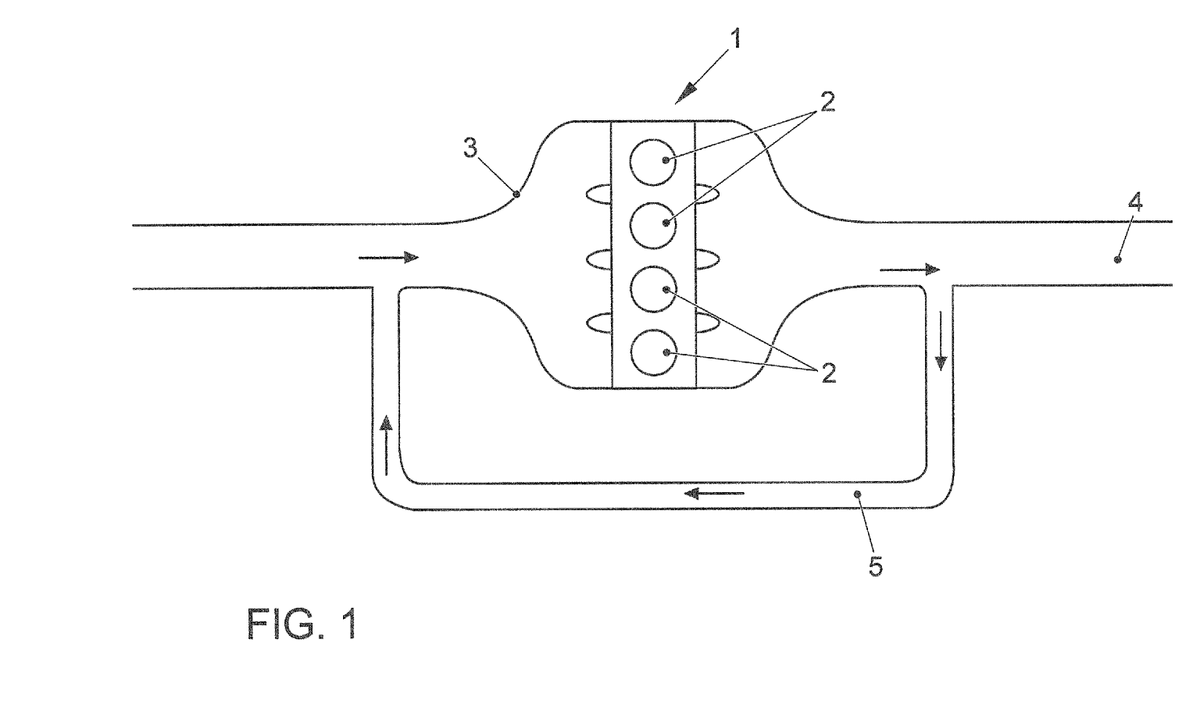
FIG. 1: a schematic diagram of an internal combustion engine.

FIG. 1 shows a greatly simplified structure of an internal combustion engine 1 with four combustion chambers 2, an intake channel 3 as well as an exhaust gas channel 4. Here, an exhaust gas recirculation line 5 is provided which connects the exhaust gas channel 4 to the intake channel 3 and thus allows burned fuel contents to be recirculated to the intake channel 3 of the internal combustion engine 1. The internal combustion engine 1 in the embodiment described below is configured as a gas engine 1 and is operated with a gaseous fuel, preferably by natural gas (compressed natural gas—CNG). As an alternative, operation with a liquefied gas (liquefied natural gas—LNG) is likewise possible. Gas engines 1 differ from classic internal combustion engines—where a liquid fuel is metered into the intake channel 3 or into the combustion chambers 2—in that the fuel is gaseous and thus highly compressible at ambient temperature and ambient pressure. As a result, the gaseous fuel cannot, or at least not efficiently, be introduced into the combustion chambers 2 of the internal combustion engine 1 by means of conventional injection technology, especially by means of an injection pump and/or a fuel injection system. Moreover, natural gas cannot be liquefied at room temperature, as a result of which the use of fuel injection technology for liquid fuels likewise falls by the wayside. For this reason, alternative mixture formation devices that are specifically adapted to the special characteristics of a gaseous fuel have been developed for gas engines 1. Here, the mixture is preferably formed in the intake channel 3 upstream from the combustion chambers 2 of the internal combustion engine 1 since the pressure level at this place is lower than in the combustion chambers 2 and consequently, the gas tank can be emptied to a greater extent.

Figure 2:
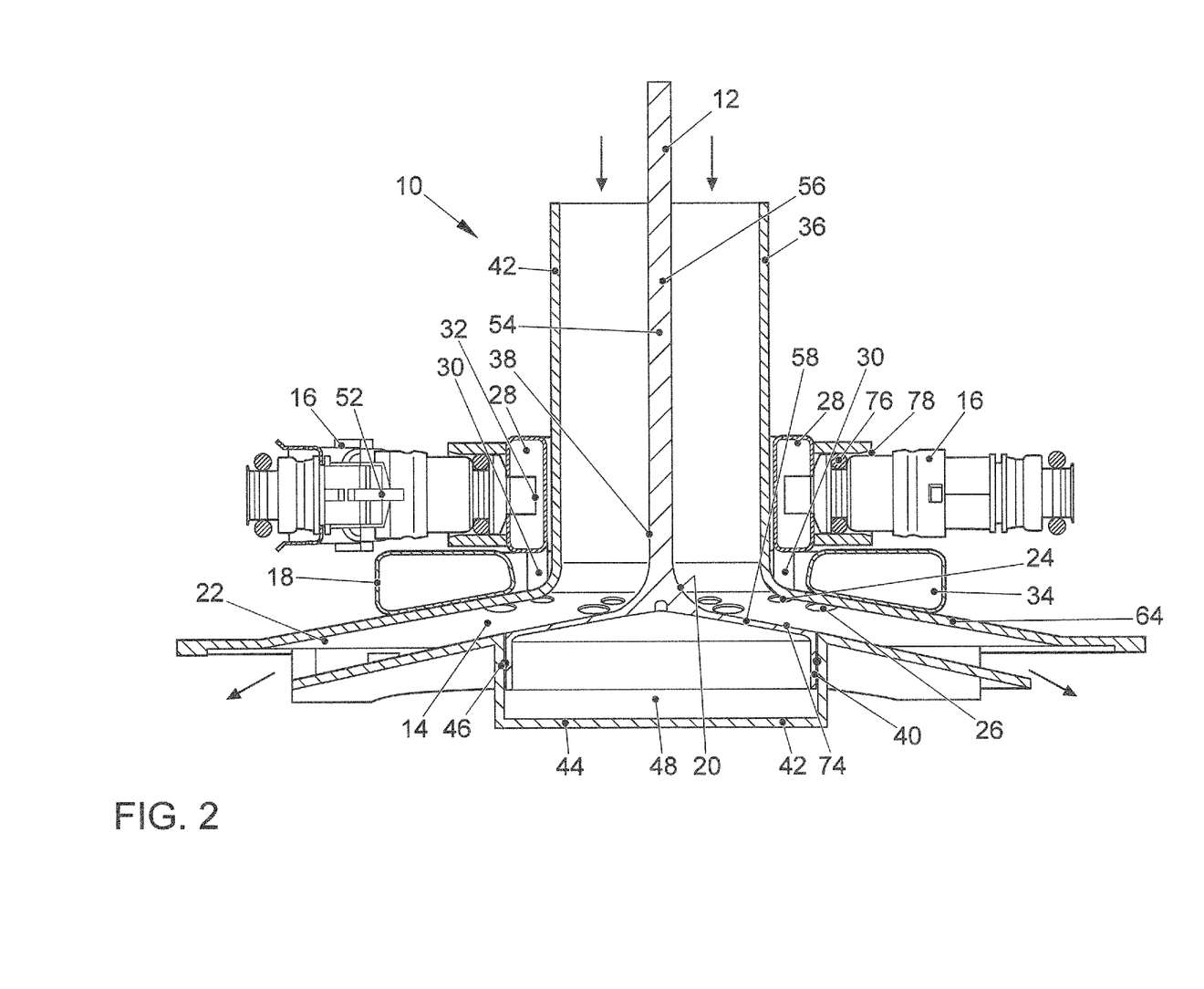
FIG. 2: a first embodiment of a mixture formation device according to the invention, in a sectional view.

FIG. 2 shows a first embodiment of a mixture formation device 10 according to the invention for an internal combustion engine 1 operated with a gaseous fuel. The mixture formation device 10 comprises a housing 42 in which a closing member 12, especially a valve 54, is arranged so that it can be moved. The housing 42 has a first section which runs vertically in the drawing plane and in which an intake pipe 36 is formed. The housing 42 also has a second section that forms a diffuser 22. The diffuser 22 runs at an angle of approximately 100° to 120° relative to the intake pipe 36. The housing 42 also has a closed housing section 44 which, together with the closing member 12, delimits an equalization volume 48. The closing member 12 is configured as a valve 54, especially as a disk valve, and it has a shaft 56 and a disk 58. The valve shaft 56 and the valve disk 58 form on their side facing the intake pipe 36 a deflecting section 38 through which the fresh air that is flowing through the mixture formation device is guided and deflected. Between the valve shaft 56 and the valve disk 58, a deflecting geometry is formed by means of which the fresh air that is flowing into the mixture formation device is deflected into the diffuser 22. The valve disk 58 is followed by a guide section 40 in which the valve 54 is installed in the closed housing section 44. The closing member 12 is configured in the area of the guide section 40 so as to be hollow and it surrounds the equalization volume 48. Between the guide section 40 and the housing wall of the closed housing section 44, there is a gasket 46 that is designed to prevent fresh air from penetrating into the equalization volume 48.

The mixture formation device 10 also has at least one receiving opening, preferably, as shown in FIG. 1, several receiving openings 78 which are preferably uniformly distributed along the circumference of the mixture formation device 10 and in each of which a metering valve 16 that serves to feed in a combustible gas is arranged. On the circumference of the metering valve 16, there is a gasket 76, especially a sealing ring, by means of which a gap between the metering valve 16 and the receiving opening 78 is sealed off, thus preventing an uncontrolled escape of the combustible gas from the mixture formation device 10. Each one of the receiving openings 78 is connected to a fuel gas distribution ring 28 in which gaseous fuel that has been fed in via the metering valves 16 can be mixed with fresh air. The fuel gas distribution ring 28 is connected to the diffuser 22 via channels 30, whereby each channel 30 runs essentially perpendicular to the diffuser 22. In order to allow combustible gas to be fed into the diffuser 22, at each end of the channel 30 facing the diffuser 22, first feed points 24 are formed via which the channels 30 are fluidically connected to the diffuser 22. Here, the channels 30 run essentially perpendicular to the outflow openings 32 of the metering valves 16. The metering valves 16 are arranged radially here, that is to say, they are oriented perpendicular to the intake pipe 36 of the mixture formation device 10. Each metering valve 16 has a plug 52 with which the metering valves 16 can be electrically contacted with the metering valves 16.

A connector for an exhaust gas recirculation line 5 of the internal combustion engine 1 is formed on the mixture formation device 10. In this context, the mixture formation device 10 has a distribution ring 34 for the exhaust gas recirculation line, said distribution ring 34 being arranged around the intake pipe 36 of the intake channel 3, at least in certain sections. The second ring channel 34 [sic] runs essentially parallel to the diffuser 22 and it is connected to this diffuser 22 via second feed points 26. In this context, the distribution ring 34 for the exhaust gas line is connected to the exhaust gas recirculation line 5 via at least one connector 18.

Figure 3:
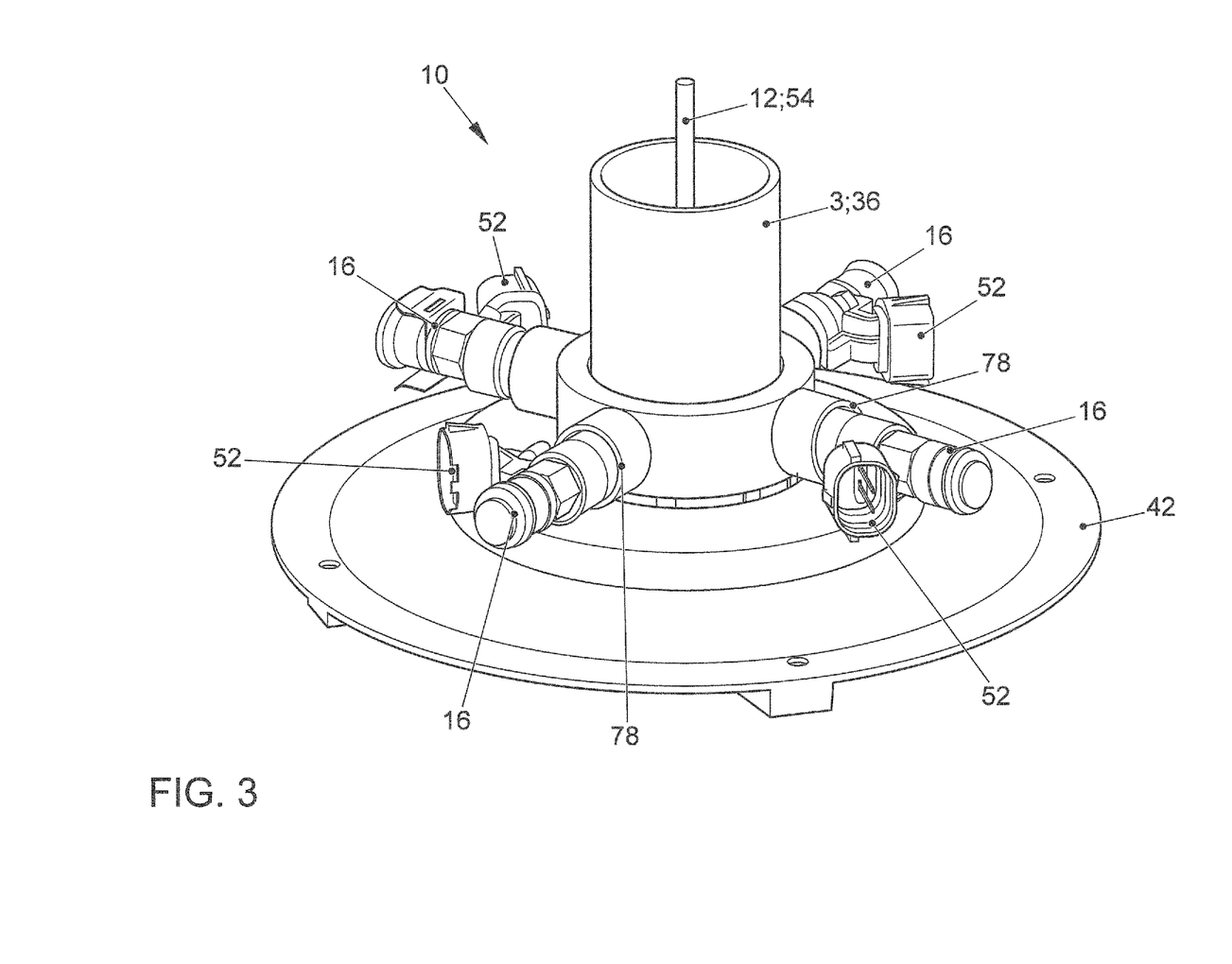
FIG. 3: the mixture formation device shown in FIG. 2, in a three-dimensional view.

FIG. 3 shows the mixture formation device 10 in a three-dimensional view. It can be seen here that the metering valve 16 is oriented perpendicular to the intake pipe 36 and that it does not project in the radial direction beyond the housing 42 of the mixture formation device 10.

During operation of the mixture formation device 10, fresh air is drawn into the mixture formation device 10 via the intake pipe 36. At the same time, the combustible gas is metered by means of the metering valve 16 into the fuel gas distribution ring 28, where a first mixing of the combustible gas with the fresh air takes place. Since the gas is deflected from the outflow opening 32 of the metering valve 16 via the wall of the precombustion chamber, and since it is further conveyed through the channel 30 into the diffuser 22, a vortex is formed that brings about a uniform and thorough mixing of fresh air and combustible gas. Downstream from the first feed point 24, the mixture consisting of fresh air and combustible gas is additionally charged with exhaust gas that has been recirculated via the exhaust gas recirculation line 5 and via the distribution ring 34 for the exhaust gas line. For this purpose, at a second feed point 26, the recirculated exhaust gas is fed into the diffuser 22, whereby the exhaust gas is mixed with the mixture consisting of fresh air and combustible gas.

Figure 10:
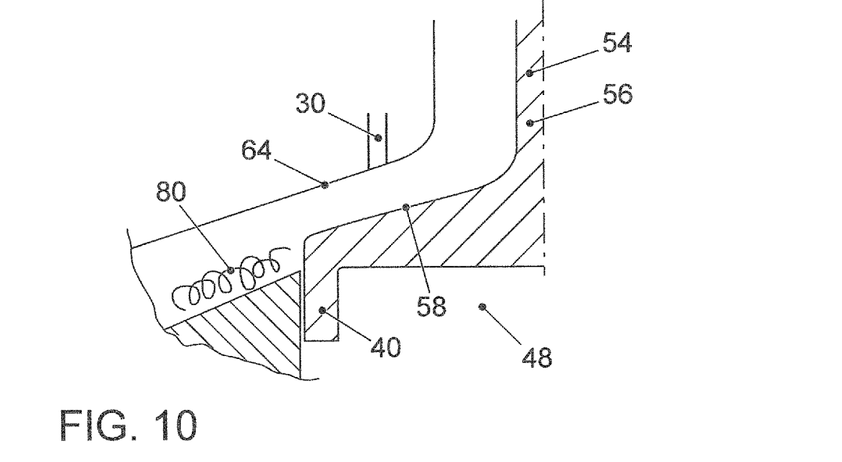
FIG. 10: a valve seat of a mixture formation device according to the invention according to the invention, with the valve partially closed.

The closing member 12 has the function of a quantity regulator and can thus replace the throttle valve in a conventional internal combustion engine. In this context, the mixture formation device 10 shown in FIG. 2 is depicted with a completely open valve 54, in other words, maximally unthrottled. When the valve 54 is closed, that is to say, moved in the direction of a seat edge 74 on the housing 42, the opening cross section 14 of the diffuser 22 can be reduced. Such a partially closed valve 54 is shown in FIG. 10. Here, in the area of the guide section 40, the valve disk 58 has a sharp trailing edge in the flow direction of the gas through the diffuser 22, thus causing the formation of a vortex downstream from the valve disk 58, a process in which the wake 80 of the vortex brings about an additional mixing of fresh air, combustible gas and exhaust gas from the exhaust gas recirculation line 5. First of all, the capability to form minute quantities, especially during idling of the internal combustion engine 1, has to be rendered possible, and so does a favorable flow guidance entailing the lowest possible losses during full load operation. The valve 54 is adjusted, for example, by means of an electro-mechanical control element although, as an alternative, this can also be achieved purely mechanically, for example, by means of a spindle, a rocker arm, a toothed gear or the like.

Figure 4:
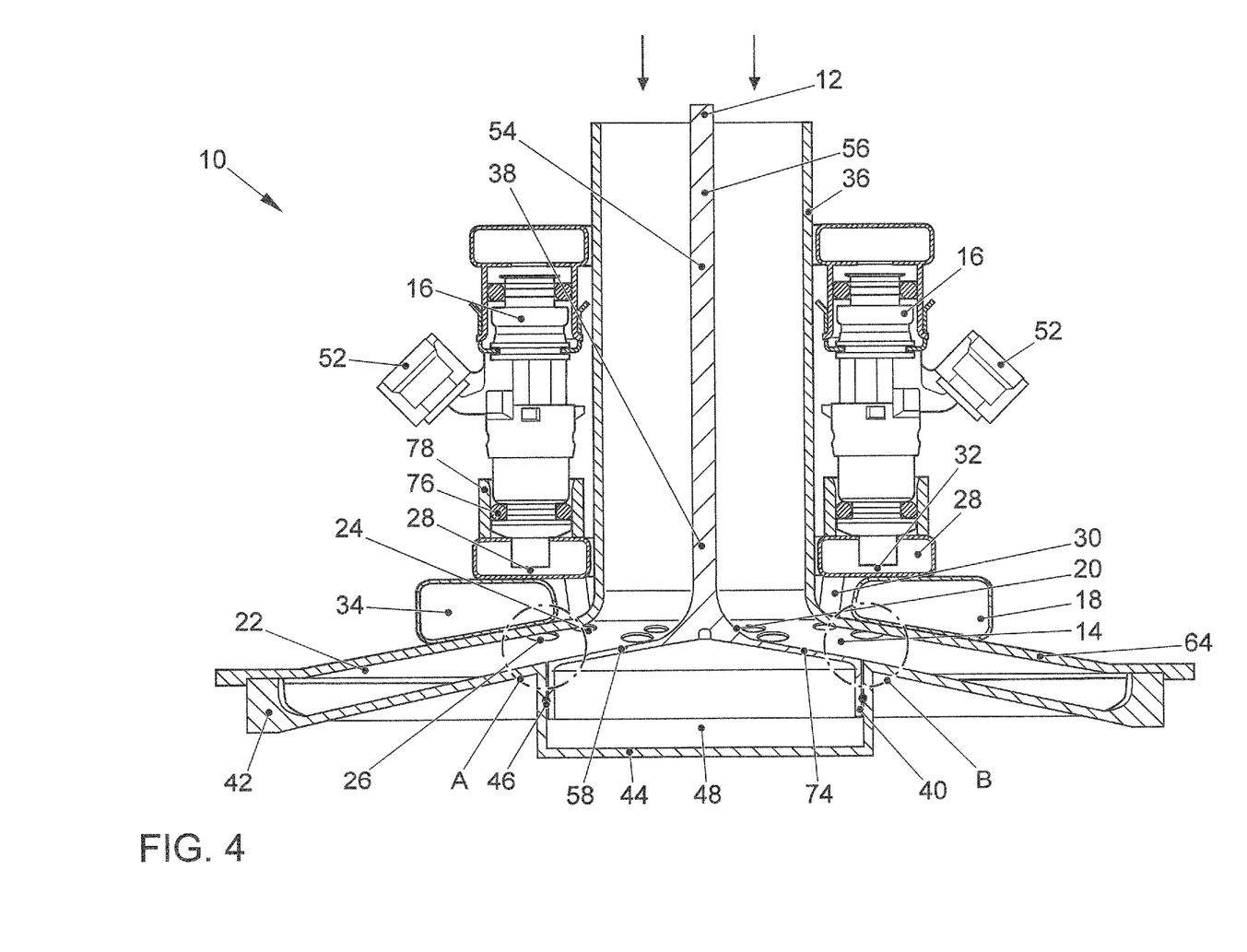
FIG. 4: a second embodiment of a mixture formation device according to the invention, in a sectional view.
Figure 5:
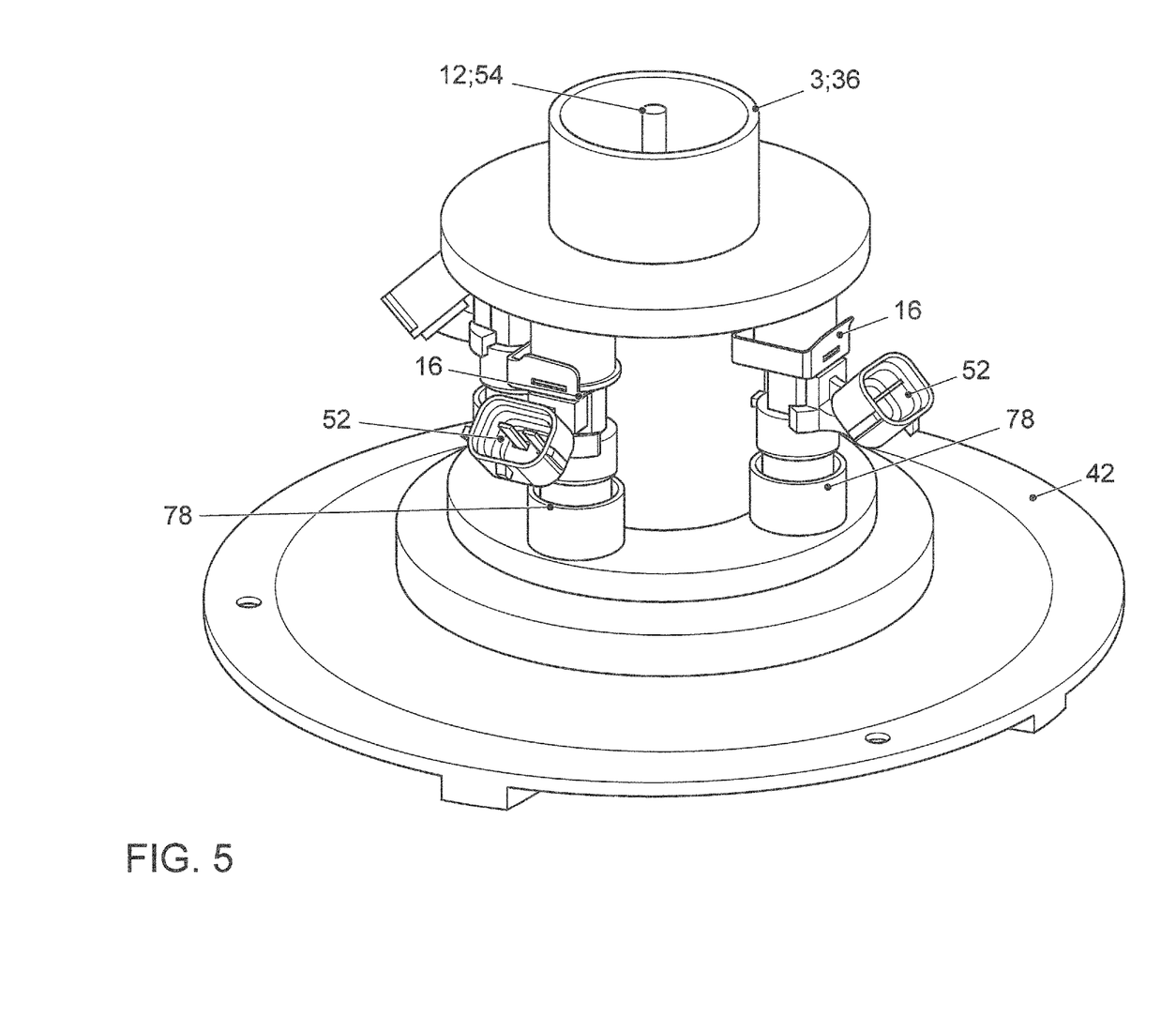
FIG. 5: the mixture formation device shown in FIG. 4, in a three-dimensional view.

FIG. 4 shows an alternative embodiment of a mixture formation device 10 according to the invention. Since its structure is essentially identical to the one shown in FIG. 2, only the actual differences will be elaborated upon below. In this embodiment, the metering valves 16 are arranged axially, that is to say, parallel to the intake pipe 36. As a result, additional space is created in the radial direction, so that the available installation space can be optimally utilized. Corresponding to the axial arrangement of the metering valves 16, the shape of the fuel gas distribution ring 28 is adapted accordingly, whereby the channel 30 is formed at one end of the fuel gas distribution ring 28 facing the intake pipe 36 and it is arranged eccentrically relative to the outflow opening 32 of the metering valve 16 in order to attain a commensurate multiple deflection and mixing of the combustible gas with the fresh air in the fuel gas distribution ring 28. FIG. 5 shows this embodiment of a mixture formation device 10 in a three-dimensional view.

Figure 6:
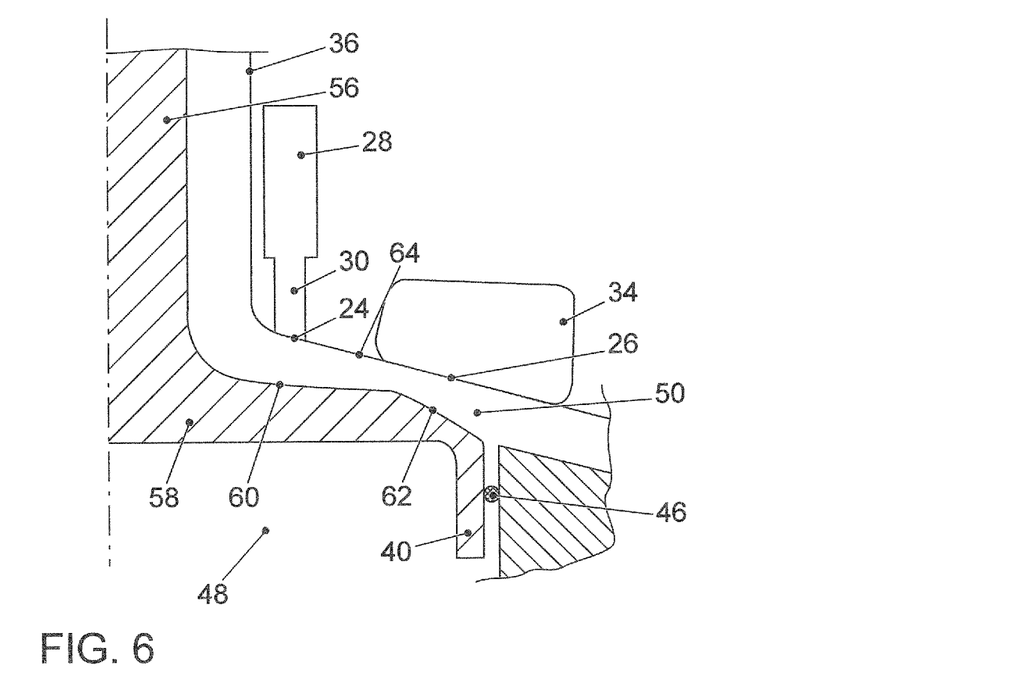
FIG. 6: a first embodiment of a valve seat of a mixture formation device according to the invention.
Figure 7:
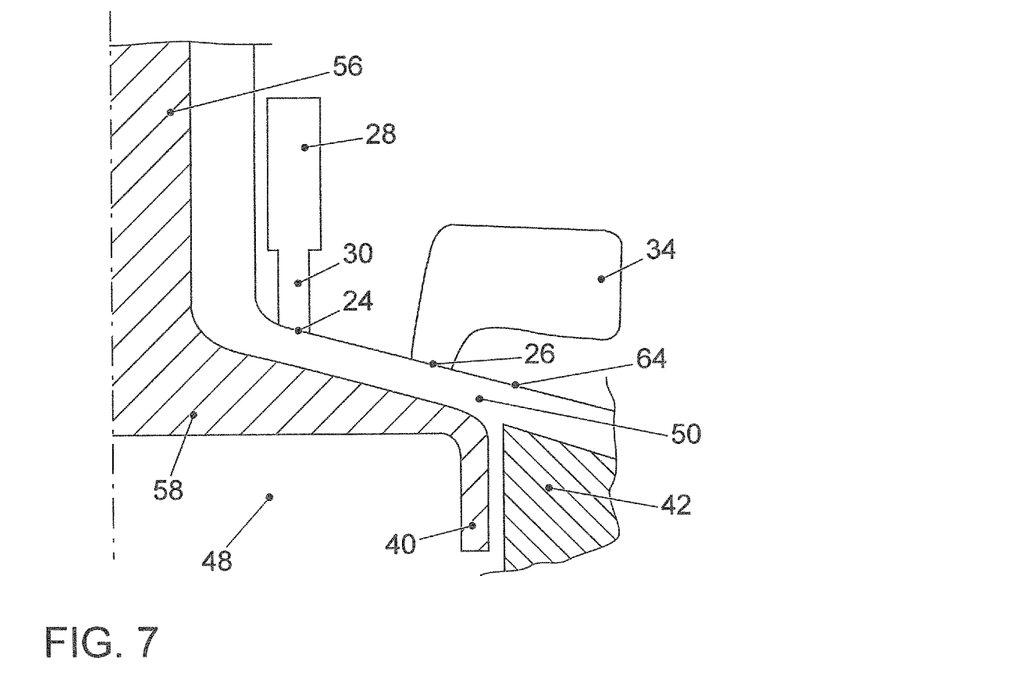
FIG. 7: another embodiment of a valve seat of a mixture formation device according to the invention.

FIG. 6 shows an alternative embodiment of the valve 54 and of the diffuser 22. Here, the disk 58 of the valve 54 has a first, radially inner section 60 and a second, radially outer section 62 that runs an angle relative to the valve shaft 56 that is greater than that of the first section 60. As a result, a diffuser 50 is created between a wall 64 of the housing 42 and the second section 62 of the valve disk 58. As an alternative, the diffuser 50, as shown in FIG. 7, can also be formed between two parts or sections of the housing 42 downstream from the valve disk 58.

Figure 8:
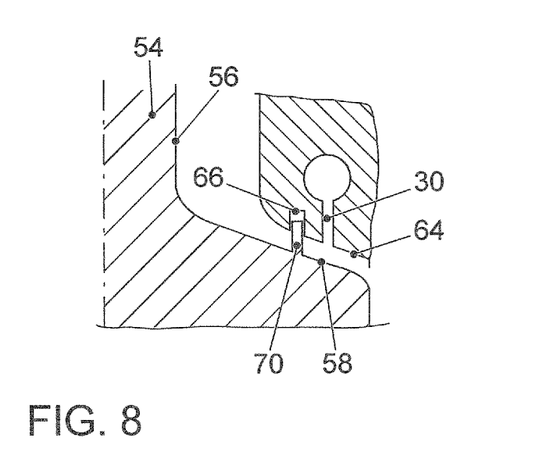
FIG. 8: another embodiment of a valve seat of a mixture formation device according to the invention.
Figure 9:
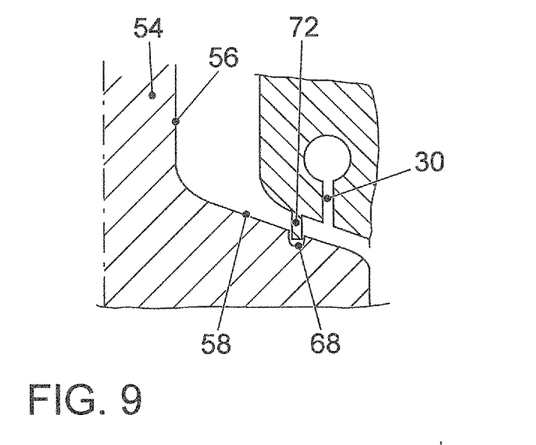
FIG. 9: another embodiment of a valve seat of a mixture formation device according to the invention.

In order to improve the capability of the mixture formation device 10 to form minute quantities, a simple labyrinth gasket can be provided on the seat of the valve 54. Towards this end, as is shown in FIG. 8, a recess 66 can be provided on the wall 64 of the housing 42, whereby a projection 70 on the valve disk 58 engages with said recess 66 when the valve 54 is essentially closed. As an alternative, as shown in FIG. 9, it is also possible for a projection 72 to be formed on the wall 64 of the housing 42, said projection 72 engaging with a recess 68 in the valve disk 58. Thanks to the profiling of the projections 70, 72, the transition from a minute quantity of metered-in combustible gas to an area with greater gas quantities can be improved, as a result of which the comfort during the dynamic operation of the internal combustion engine 1 is enhanced.

LIST OF REFERENCE NUMERALS 1 internal combustion engine/gas engine
2 combustion chamber
3 intake channel
4 exhaust gas channel
5 exhaust gas recirculation line
10 mixture formation device
12 closing member
14 opening cross section
16 metering valve
18 connector
20 pressure equalization hole
22 diffuser
24 first feed point
26 second feed point
28 fuel gas distribution ring
30 channel
32 outflow opening
34 distribution ring for the exhaust gas line
36 intake pipe 38 deflecting section
40 guide section
42 housing
44 closed housing section
46 gasket
48 equalization volume
50 diffuser
52 plug
54 valve
56 valve shaft
58 valve disk
60 first section
62 second section
64 wall
66 recess
68 recess
70 projection
72 projection
74 seat edge
76 gasket
78 receiving opening
80 wake of the vortex

The invention claimed is:

1. A mixture formation device for installation in an intake channel of an internal combustion engine operated with a combustible gas, comprising:
   a closing member capable of reducing an opening cross section of the intake channel of the internal combustion engine, wherein the closing member has a deflecting geometry configured to divert a fresh air stream into a diffuser,
   at least one metering valve for metering the combustible gas into the intake channel of the internal combustion engine,
   at least one connector for an exhaust gas recirculation line of the internal combustion engine,
   a first feed point for the combustible gas and a second feed point for a gas that has been recirculated via the exhaust gas recirculation line arranged downstream from the deflecting geometry of the closing member,
   wherein the closing member has a deflecting section to guide the flow of at least one of the fresh air, the combustible gas and the recirculated exhaust gas, and has a guide section configured for guiding the closing member in a housing of the mixture formation device, and
   wherein the guide section is positioned on a closed section of the housing.

2. The mixture formation device according to claim 1, wherein the at least one metering valve meters the combustible gas into a fuel gas distribution ring that is connected via a channel to the diffuser of the intake channel.

3. The mixture formation device according to claim 2, wherein the channel runs essentially perpendicular to an outflow opening of the metering valve.

4. The mixture formation device according to claim 1, wherein the exhaust gas recirculation line has an exhaust gas recirculation distribution ring that runs around an intake pipe of the intake channel, at least in certain sections.

5. The mixture formation device according to claim 1, wherein a gasket is arranged between the guide section and the housing.

6. The mixture formation device according to claim 1, wherein the closing member is hollow in the area of the guide section and surrounds an equalization volume.

7. The mixture formation device according to claim 1, wherein the second feed point for the exhaust gas recirculation line is located downstream from the first feed point for the gas, as seen in the flow direction of the fresh air through the intake channel.

8. The mixture formation device according to claim 1, wherein a gap width of the diffuser amounts to approximately ⅛ to 1/800 of the diameter of an intake pipe of the intake channel.

9. The mixture formation device according to claim 1, wherein the closing member is a valve having a shaft and a disk, whereby the valve disk has a first, radially inner section that runs at a first angle relative to the valve shaft, and a second, radially outer section that runs at an angle relative to the valve shaft that is greater than that of the first section.

10. The mixture formation device according to claim 9, wherein the diffuser is formed downstream from the closing member.

11. The mixture formation device according to claim 9, wherein a recess is formed on the valve disk or on a wall of the diffuser located opposite from the valve disk, and a projection that protrudes into the recess is formed on the appertaining opposite component.

12. The mixture formation device according to claim 1, wherein the first feed point and the second feed point are arranged along a shared diameter.

13. A gas engine comprising at least a combustion chamber, an intake channel, an exhaust gas channel, an exhaust gas recirculation line, and a mixture formation device according to claim 1, whereby a combustible gas for operating the gas engine is metered into the intake channel of the gas engine by means of a regulatable metering valve upstream from the combustion chamber.

\* \* \* \* \*